United States Patent [19]
Shirai et al.

[11] Patent Number: 6,116,783
[45] Date of Patent: Sep. 12, 2000

[54] BALL CHAIN

[75] Inventors: Takeki Shirai; Shigeru Ebina; Mitsuaki Honma; Tomozumi Murata, all of Tokyo, Japan

[73] Assignee: THK Co., Ltd., Tokyo, Japan

[21] Appl. No.: 09/142,139

[22] PCT Filed: Jan. 14, 1998

[86] PCT No.: PCT/JP98/00120

§ 371 Date: Sep. 2, 1998

§ 102(e) Date: Sep. 2, 1998

[87] PCT Pub. No.: WO98/31945

PCT Pub. Date: Jul. 23, 1998

[30] Foreign Application Priority Data

Jan. 17, 1997 [JP] Japan ..................................... 9-006760
Feb. 28, 1997 [JP] Japan ..................................... 9-046179

[51] Int. Cl.[7] ...................................................... F16C 29/06
[52] U.S. Cl. ................................ 384/43; 384/45; 384/51
[58] Field of Search ................................ 384/43, 44, 45, 384/49, 51

[56] References Cited

U.S. PATENT DOCUMENTS 4,944,607  7/1990  Jacob ........................................ 384/44

FOREIGN PATENT DOCUMENTS

| 2 655 099 | 5/1991 | France . | |
| 42 29 136 C1 | 3/1994 | Germany . | |
| 59-24226 | 2/1984 | Japan . | |
| 5-52215 | 3/1993 | Japan . | |
| 5-52217 | 3/1993 | Japan . | |
| 5-196037 | 8/1993 | Japan . | |
| 2 104 600 | 3/1983 | United Kingdom . | |
| WO92/14070 | 8/1992 | WIPO | ..................................... 384/51 |

OTHER PUBLICATIONS

Abstract of Japanese Patent Publication No. 05196037; dated Aug. 6, 1993.

*Primary Examiner*—Thomas R. Hannon
*Attorney, Agent, or Firm*—Nikaido, Marmelstein, Murray & Oram LLP

[57] ABSTRACT

The present invention relates to a ball chain used by being integrated to, for example, a ball endless track of a linear guide device for endless sliding in which a number of balls are arranged in one row and rollably held, particularly to a ball chain which is most pertinent to a linear guide device having a ball rolling groove in a shape of a Gothic arch. According to the ball chain, the number of balls are arranged in one row and the balls are held rollably, each of the balls is pinched by a pair of spherical seats and the spherical seats are connected to each other by flange portions to thereby constitute a ball holding unit and a plurality of the ball holding units are connected in a shape of a rosary by a flexible connecting portion. Further, the spherical seats and the flange portions are molded by a resin material whereas the connecting portion is formed by a material having a tensile strength larger than that of the resin material.

3 Claims, 12 Drawing Sheets

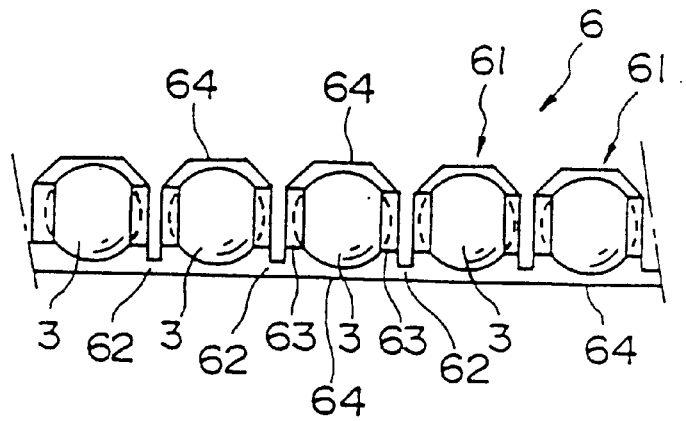
Fig. 5a
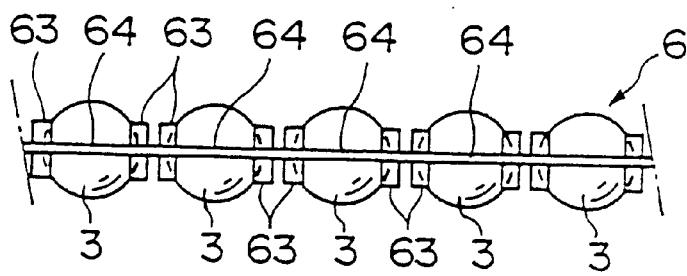
Fig. 5b
Fig. 6
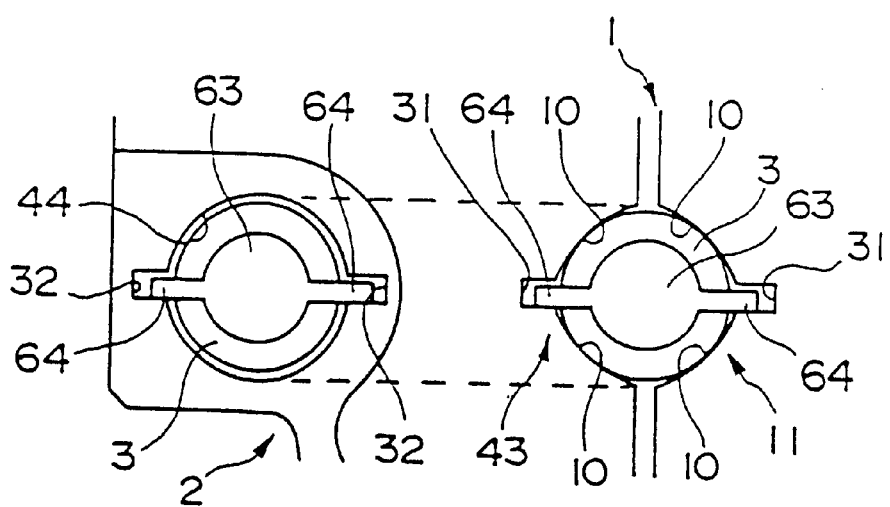

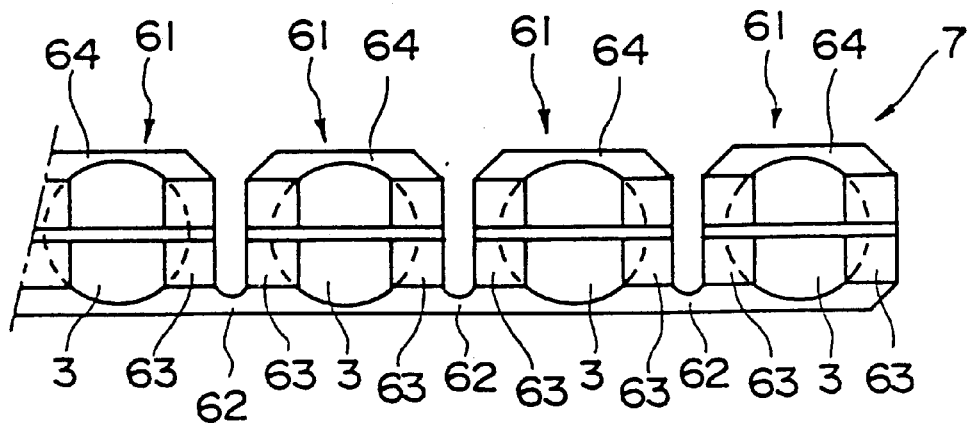
Fig. 8
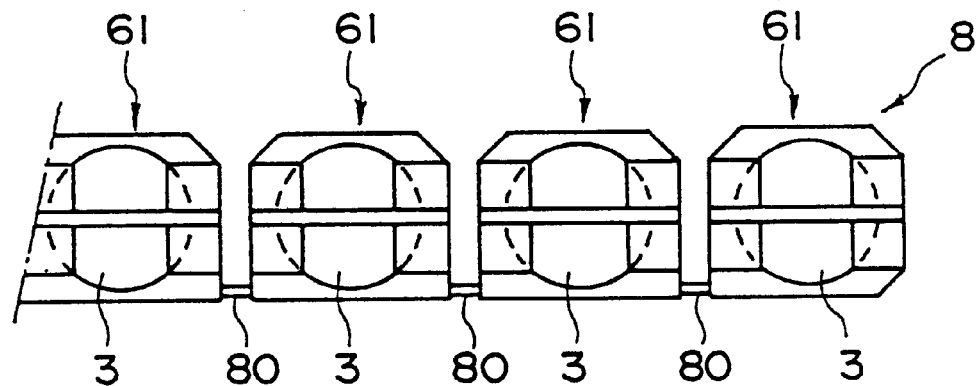
Fig. 9
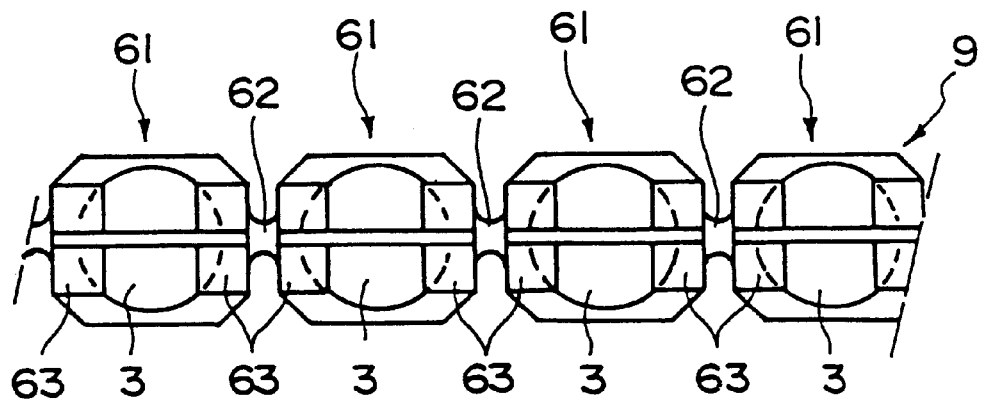

Fig.14
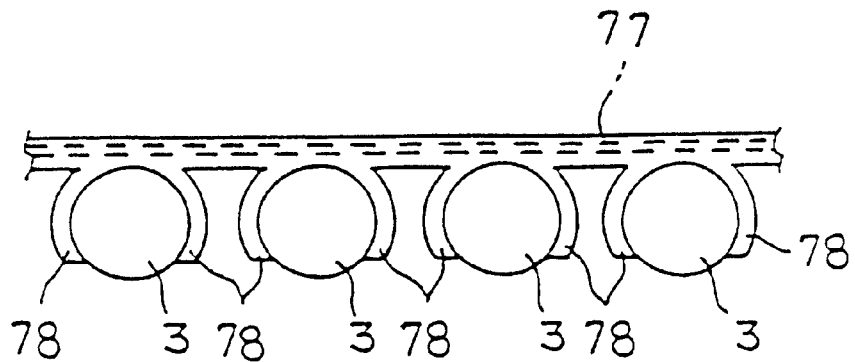
Fig. 15
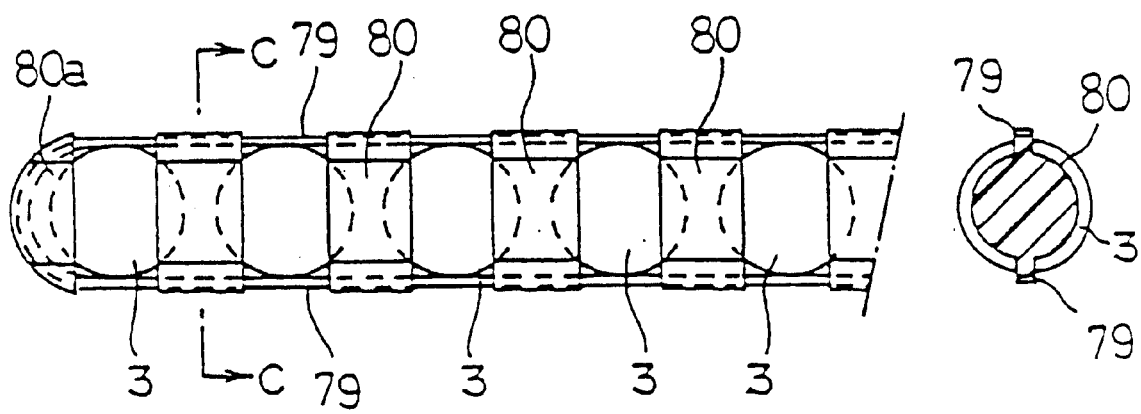
Fig. 15a

BALL CHAIN

TECHNICAL FIELD

The present invention relates to a ball chain used by being integrated, for example, to a ball endless track of a linear guide device for endless sliding in which a number of balls are arranged in one row and are held rollably, particularly to a ball chain which is most pertinent in a linear guide device having a ball rolling groove in a shape of a Gothic arch.

BACKGROUND ART

There has conventionally been known a linear guide device for guiding a movable body of a table or the like along a fixed unit of a bed or the like, which is constituted by a track rail having a ball rolling groove, a slider having a load rolling groove opposed to the ball rolling groove, having a no load rolling path for circulating balls from one end to other end of the load rolling groove and moved along the track rail and a number of the balls rolling between the slider and the track rail while carrying a load and circulating an endless track constituted by the load rolling groove of the slider and the no load rolling path.

According to the conventional linear guide device constituted in this way, the endless track of the slider is filled with the balls and accordingly, when the slider is moved along the track rail, the balls contiguous to each other are circulated in the endless track while colliding or sliding with each other by which there poses a problem in which the balls are worn at an early stage and the life of the device is shortened.

Hence, in order to resolve such a problem, there has been proposed a linear guide device in which a ball chain aligning and holding a number of balls is integrated to the endless track (Japanese Unexamined Patent Publication No. JP-A-5-52217). As shown by FIG. 16 and FIG. 17, according to such a ball chain 100, spacers 102 are interposed among respective balls 101 contiguous to each other, the balls 101 are connected in a shape of a rosary (i.e., string of beads) by connecting the respective spacers 102 by connecting portions 103 in a strip-like shape and the balls 101 are fabricated by injection molding of flexible resin where balls 101 are arranged in a mold as cores.

The conventional ball chain 100 constituted in this way, is integrated in an endless track 105 of a slider 104 and circulated in the endless track as shown by FIG. 18, in this case, the spacers 102 are interposed among the balls 101 contiguous to each other and therefore, mutual friction or collision among the balls is prevented and wear of the balls 101 can be minimized.

However, according to such a conventional ball chain 100, one of the spacers 102 supports two of the balls 101 disposed on both sides thereof and therefore, when an angle of contact of the spacer 102 with respect to the ball 101 is changed by bending or twisting the ball chain 100, there poses a problem in which the balls 101 drop off among the spacers 102.

Accordingly, although the conventional ball chain sufficiently achieves a function as a ball retainer for preventing mutual contact of balls, a function thereof as a so-called ball case for preventing detachment of balls is not sufficient. Therefore, according to a conventional linear guide device integrated with such a ball chain, in order to completely prevent accident of detachment of balls when a slider is removed from a track rail, as shown by FIG. 19, ball retainers 107 are installed on both sides of a load rolling groove 106 of a slider 104.

However, when a ball rolling groove 109 of a track rail 108 and the load rolling groove 106 of the slider 104 are formed in the shape of a so-called circular arc comprising a single ball rolling face, the depths of the rolling grooves 106 and 109 are comparatively small relative to the radius of the ball 101 and therefore, although as shown by FIG. 19, the ball retainers 107 can be formed on the both sides of the load rolling groove 106 of the slider 104, when the ball rolling groove 109 and the load rolling groove 106 are formed in a shape of a Gothic arch, that is, in a shape where a pair of ball rolling faces are intersected with each other, as shown by FIG. 20, the depths of the rolling grooves 106 and 109 are near to the radius of the ball 101 and accordingly, it is almost impossible to install the ball retainers 107 on the both sides of the load rolling groove 106.

Therefore, in integrating a ball chain to a linear guide device having ball rolling grooves in the shape of a Gothic arch, it is necessary to ensure sufficiently the function of the ball chain for retaining the balls and it is problematic to integrate a conventional ball chain having such a weak function as it is.

Meanwhile, such a ball chain 100 is used by being circulated in an endless track and accordingly, it is preferable to make the connecting portion 103 for connecting the respective spacers 102 as thin as possible and make a sectional area thereof as small as possible to flexibly bend the ball chain 100 in the endless track.

Meanwhile, considering that the respective spacers 102 are brought into sliding contact with the balls 101, the resin material used in molding the ball chain 100 needs to be provided with lubrication performance, wear resistance and the like with respect to rolling of the balls 101 and therefore, there is a constant restriction in selecting resin for molding the ball chain 100 and mechanical strength of the mold resin per se is difficult to provide.

Therefore, according to the conventional ball chain 100, the tensile strength of the connecting portion 103 is lower and there results a problem in which the connecting portion 103 is broken between the respective spacers 102 when the ball chain is being used in an endless circulating path.

DISCLOSURE OF THE INVENTION

The present invention has been carried out in view of such a problem and it is a first object thereof to provide a ball chain capable of firmly holding balls even when the ball chain is bent or twisted or the like and which is most pertinent to a linear guide device having a ball rolling groove in a shape of a Gothic arch.

Further, it is a second object of the present invention to provide a ball chain in which lubrication performance and wear resistance with respect to rolling of balls are excellent, arranged balls are rolled excellently and which is provided with sufficient tensile strength and capable of preventing breaking of the ball chain while it is being used.

According to an aspect of the present invention achieving the first object, there is provided a ball chain arranged with a number of balls in one row and rollably holding the balls wherein each of the bails are pinched by a pair of spherical seats and the spherical seats are connected to each other by flange portions to thereby constitute a ball holding unit and a plurality of the ball holding units are connected in the shape of a string of beads by a flexible connecting portion.

According to such a technical means, each of the balls is pinched by the pair of spherical seats connected by the flange portions, the ball holding unit is constituted for each of the balls and the ball chain is constituted by connecting the ball holding units in a shape of a string of beads by the flexible connecting portion and accordingly, even when the ball chain is bent or twisted or the like, the angle of contact of the spherical seat with respect to the ball remains unchanged and the ball can be held at each of the ball holding unit with certainty.

In this case, the ball chain according to the present invention can be fabricated by injection molding of synthetic resin in which the balls are inserted into a mold as cores and in view of reducing the minimum radius in bending the ball chain in a shape of a circular arc, it is preferable that the connecting portion is softer and the sectional area is preferably small.

Further, according to another aspect of the present invention achieving the second object mentioned above, there is provided a ball chain comprising a number of balls arranged in one row, a plurality of ball holding members arranged among the balls contiguous to each other for rotatably holding the balls and a connecting portion for connecting the ball holding members wherein the tensile strength of the connecting portions is larger than a tensile strength of the ball holding members.

According to such a technical means, the ball holding members for rotatably holding the balls are interposed among the balls contiguous to each other, the ball holding members are connected to each other by the connecting portion having a tensile strength larger than a tensile strength of the ball holding member and accordingly, even when a material for molding the ball holding member which is provided with a low mechanical strength is used, a sufficient tensile strength can be ensured for the ball chain as a whole. Further, the mechanical strength of the material per se for molding the ball holding member does not pose any problem and the tensile strength of the ball chain as a whole can be ensured and accordingly, such a molding material can be selected only in view of lubrication performance, wear resistance or the like with respect to rolling of the balls and excellent rolling of the arranged balls can be expected.

In this case, although the ball chain according to the present invention can be integrated by penetrating the connecting portion such as wire or the like through the ball holding members molded by resin, the integrating operation is troublesome when the ball holding members are penetrated one by one by the connecting portion and in view of reducing time and labor of integration, it is preferable to pad the ball holding members to the connecting portion by injection molding of synthetic resin.

Further, in molding the ball holding members by such an injection molding, it is preferable to form recesses and protrusions at the connecting portion in correspondence with portions for molding the ball holding members such that the ball holding members do not drop off the connecting portion after molding.

BRIEF DESCRIPTION OF DRAWINGS

FIG. 5 illustrates a plane view and a front view showing the first embodiment of the ball chain according to the present invention;

FIG. 6 is an enlarged view showing a section of the endless track of balls according to the first embodiment of a linear guide device;

FIG. 7 is a plane view showing a second embodiment of a ball chain according to the present invention;

FIG. 8 is a plane view showing a third embodiment of a ball chain according to the present invention;

FIG. 9 is a plane view showing a fourth embodiment of a ball chain according to the present invention;

FIG. 14 illustrates a front view and a sectional view showing a seventh embodiment of a ball chain according to the present invention;

FIG. 15 illustrates a front view and a sectional view showing an eighth embodiment of a ball chain according to the present invention;

[Description of Notation]

Figure 1:
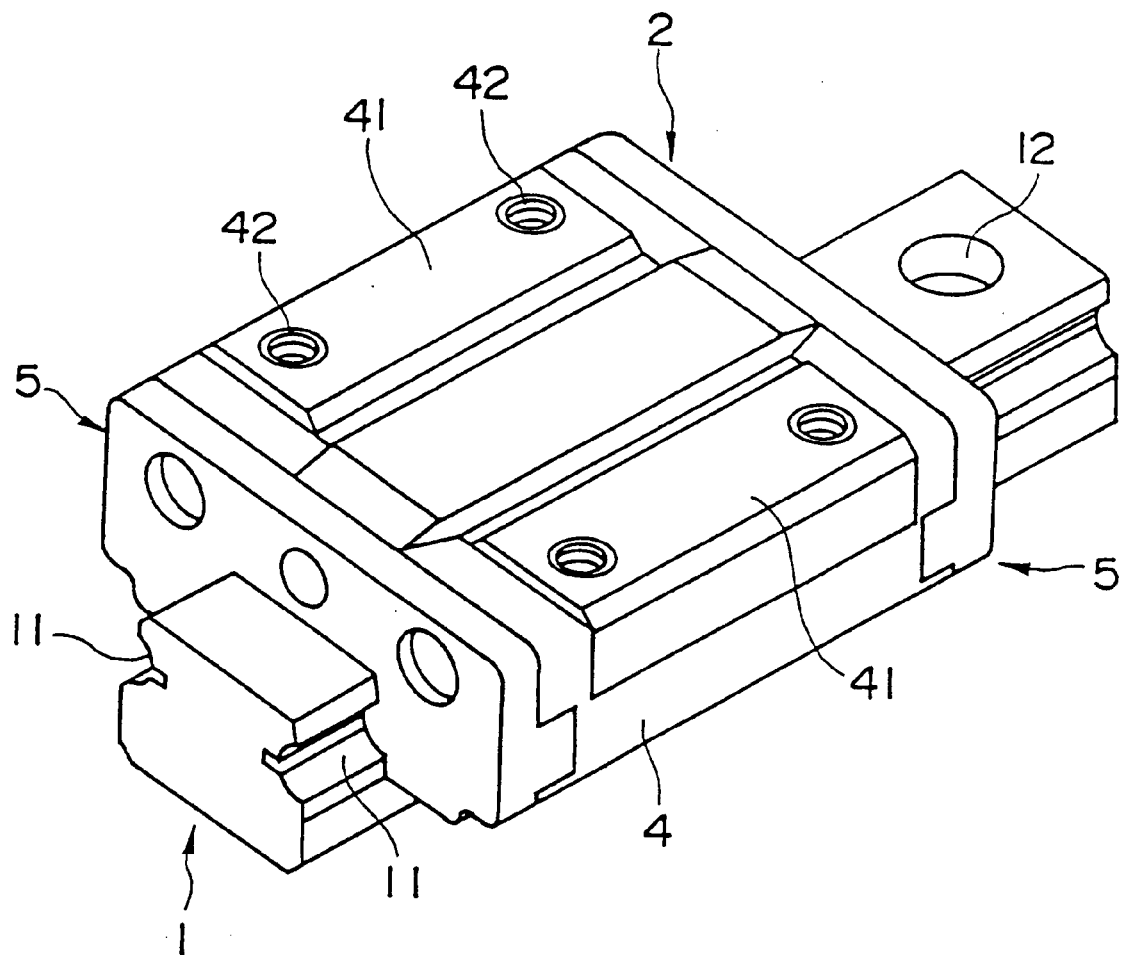
FIG. 1 is a perspective view showing a first embodiment of a linear guide device using a ball chain according to the present invention.

1 . . . Track rail 2 . . . slider 3 . . . ball b . . . ball chain 11 . . . ball rolling groove 31 . . . escape groove 43 . . . load rolling groove 61 . . . ball holding unit 62 . . . connecting portion 63 . . . spherical seat 64 . . . flange portion

BEST MODE FOR CARRYING OUT THE INVENTION

A detailed explanation will be given of a ball chain according to the present invention in reference to attached drawings as follows.

First Embodiment

Figure 2:
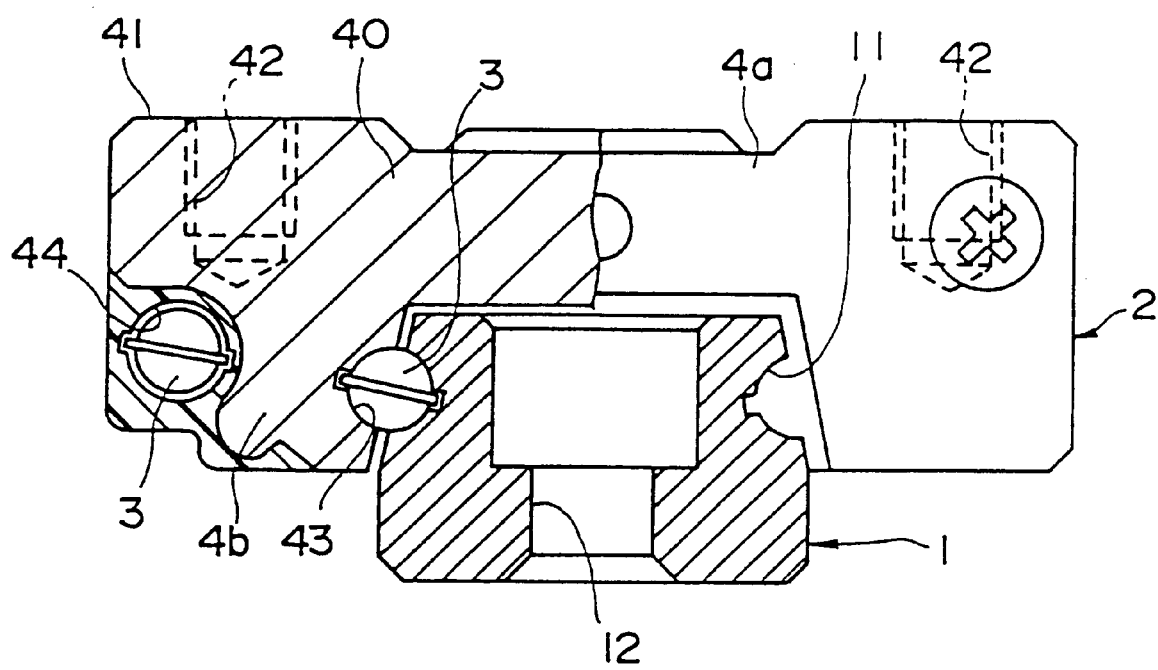
FIG. 2 illustrates a front view and a sectional view showing the first embodiment of the linear guide device according to the present invention.

FIG. 1 and FIG. 2 show an embodiment of a linear guide device integrated with a ball chain according to the present invention.

In the drawings, notation 1 designates a track rail arranged at a fixed unit of a bed of a machine tool or the like, notation 2 designates a slider for guiding a movable body of a table or the like along the track rail 1, notation 3 designates a ball rolling between the track rail 1 and the slider 2 while carrying a load and is endlessly circulated in the slider 2.

First, a section of the track rail 1 is formed substantially in a rectangular shape and a total of two streaks of ball rolling grooves 11 where the balls 3 roll are formed on both side faces thereof along a longitudinal direction (direction orthogonal to paper face of FIG. 2). The track rail 1 is formed with bolt attaching holes 12 at pertinent intervals in the longitudinal direction and the track rail 1 is fixed to the fixed unit by fixing bolts, not illustrated, which are inserted into the bolt attaching holes 12.

Further, the slider 2 is constituted by a moving block 4 having attaching faces 41 for a movable body of a table or the like and tap holes 42 into which fixing bolts of the movable body are screwed and a pair of lids 5 which are fixed to both front and rear end faces of the moving block 4 and endless tracks of the balls 3 are provided in the slider by fixing the lids 5 to the moving block 4.

A section of the moving block 4 is formed substantially in the shape of a saddle having a horizontal portion 4a formed with the attaching faces 41 and a pair of skirt portions 4b hung from the horizontal portion 4a and a load rolling groove 43 opposed to the ball rolling groove 11 of the track rail 1 is formed on an inner face side of each of the skirt portions 4b. Further, a ball return hole 44 in correspondence with each of the load rolling grooves 43 is formed at each of the skirt portions 4b in which the balls 3 finished with rolling on the load rolling groove 43 and relieved of the load are rolled in the reverse direction to the direction of rolling on the load rolling groove 43.

The moving block 4 is fabricated by utilizing injection molding of synthetic resin. That is, the moving block 4 is formed by padding synthetic resin by injection molding to a block main body 40 made of metal and formed by machining, portions requiring mechanical strength such as the movable body attaching face 41, the load rolling face 43 of the ball 3 and the like mentioned above, are formed in the block main body 40 and in the meantime, portions where mechanical strength is not important, such as the ball return hole 44 and the like, are formed of synthetic resin and light weight formation of the moving block 4 is achieved as light as possible.

Figure 3:
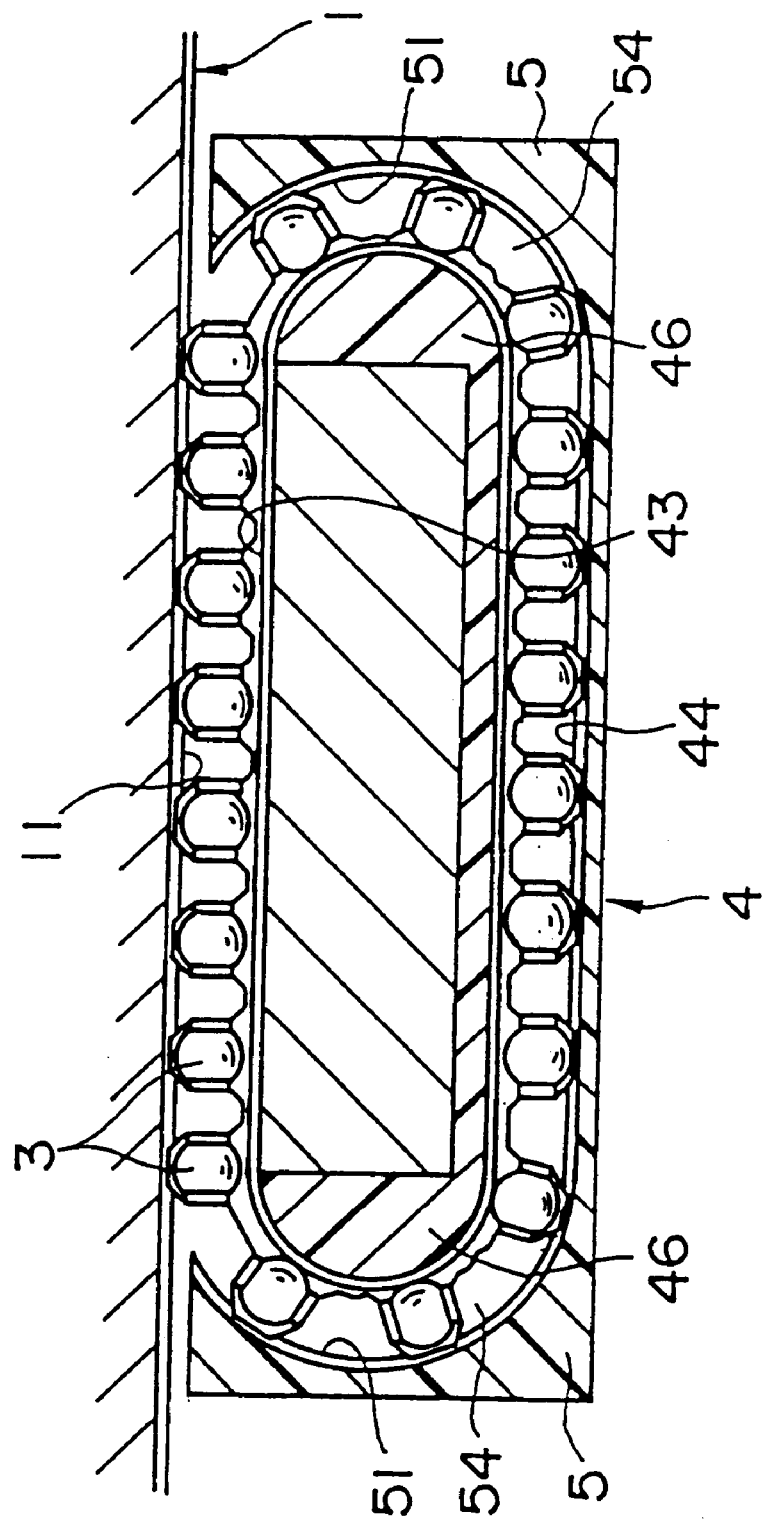
FIG. 3 is a sectional view showing an endless track of balls provided to a slider according to the first embodiment.
Figure 4:
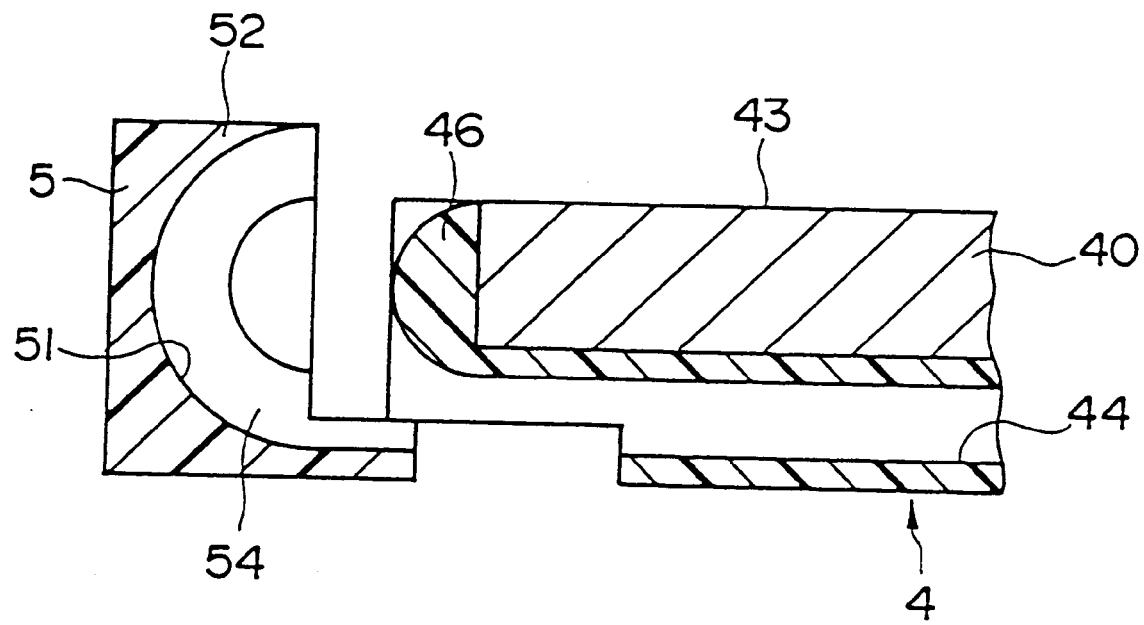
FIG. 4 is a view disassembling a moving block and a lid constituting the endless track of balls.

FIG. 3 is a sectional view showing an endless track of the balls 3 provided to the slider 2 and as shown by FIG. 4, the endless track is completed by fixing the lids 5 to end faces of the moving block 4. That is, when the lid 5 is fixed to the moving block 4, a ball guide portion 46 on the side of the moving block 4 is fitted into a U-shape groove 51 on the side of the lid 5 by which a direction change path 54 in a U-like shape is completed and the load rolling face 43 of the moving block 4 is connected to the ball return hole 44 by the direction change path 54.

Thereby, when the balls 3 carrying a load between the ball rolling groove 11 of the track rail 1 and a load rolling groove 43 of the moving block 4, finishes rolling on the load rolling groove 43 in accordance with movement of the slider 2, the balls are relieved of the load, enter the direction change path 54 of one of the lids 5 and are rolled in the ball return hole 44 of the moving block 4 in a no load state as they are in the reverse direction to the direction of rolling on the load rolling groove 43. Further, the balls 3 which have finished rolling in the ball return hole 44, enter again between the track rail 1 and the moving block 4 via the direction change path 54 of other of the lids 5 and roll on the load rolling groove 43 while carrying the load.

Meanwhile, the balls 3 are integrated to the endless track of the slider 2 in a state where they are held in one row by the ball chain 6 and the ball chain 6 is circulated in the endless track in accordance with rolling of the balls 3. As shown by FIG. 5, the ball chain 6 is formed by connecting a plurality of ball holding units 61 each holding a single ball 3 in a shape of a string of beads by a flexible connecting portion 62 and each of the ball holding units 61 is constituted by a pair of spherical seats 63 pinching the ball 3 from left and from right and flange portions 64 connecting the spherical seats 63 to each other.

The connecting portion 62 connects only side ends on one side of the ball holding units 61 arranged in one row to each other and when the connecting portion 62 is flexed as shown by FIG. 3, slit-like spaces among the ball holding units 61 contiguous to each other are expanded and the ball chain 6 per se can be bent in a ring-like shape in a state where the flange portions 64 are disposed on an inner peripheral side or an outer peripheral side.

Further, the ball chain 6 is formed by injection molding of synthetic resin inserted with the balls 3 as cores in a mold and the connecting portions 62, the spherical seats 63 and the flange portions 64 are integrally molded by such an injection molding and the balls 3 are incorporated by the spherical seats 63.

FIG. 6 is an enlarged sectional view showing a state of rolling the balls 3 in the endless track.

The load rolling groove 43 of the slider 2 and the ball rolling groove 11 of the track rail 1 are formed in a shape of a Gothic arch formed by intersecting two of ball rolling faces 10 to each other and each of the balls 3 is brought into contact with two points of each of the load rolling groove 43 and the ball rolling groove 11. Further, escape grooves 31 are respectively formed at deepest portions of the ball rolling groove 11 and the load rolling groove 43 which are formed in a shape of a Gothic arch, that is, positions in each of which the two ball rolling faces 10 are intersected with each other and the flange portions 64 of the ball chain 6 are contained in the escape grooves 31 while the balls 3 are rolling in the rolling grooves 43 and 11.

Further, guide grooves 32 are formed in the ball return hole 44 of the slider 2 along the longitudinal direction, the flange portions 64 of the ball chain 6 under a no load state are guided by the guide grooves 32 and the ball chain 6 is prevented from meandering in the ball return hole 44.

Further, according to the linear guide device of the embodiment constituted as described above, when the slider 2 is moved on the track rail 1, the balls 3 roll on the load rolling groove 43 of the slider 2 and the ball rolling groove 11 of the track rail 1 and the ball chain 6 is circulated inside of the endless track formed in the slider 2. In this case, according to the respective ball holding units 61 constituting the ball chain 6, regardless of a state of flexing or extending the ball chain 6, pairs of the spherical seats 63 always pinch the balls 3 with certainty and therefore, the balls 3 can be prevented from dropping off the ball chain 6 as less as possible.

Further, the ball chain 6 in the endless track is circulated while disposing the flange portions 64 on the outer peripheral side or the inner peripheral side and accordingly, for example, even when the slider 2 is drawn from the track rail 1 (state where track rail 1 is removed in FIG. 6), the balls 3 are brought into a state where they are pinched from three directions by the load rolling groove 43 of the slider 2 and the flange portions 64 of the ball chain 6 and the balls 3 can be prevented from dropping off the endless track of the slider 2 with certainty.

Second Embodiment

FIG. 7 shows a second embodiment of a ball chain according to the present invention. Although the ball chain 7 is provided with a constitution substantially similar to that of the ball chain 6 of the first embodiment shown by FIG. 5, the constitution is different therefrom only in that the flange portions 64 connecting pairs of the spherical seats 63 are arranged to divide in four the surroundings of the balls 3. Therefore, according to the ball chain 7 of the second embodiment, the balls 3 are completely constrained at insides of the ball holding units 61 and the balls 3 can be completely prevented from dropping off the ball chain 7.

Third Embodiment

FIG. 8 shows a third embodiment of a ball chain according to the present invention.

According to the ball chain 6 of the first embodiment, the connecting portion 62 for connecting the respective ball holding units 61 are also molded by resin and therefore, when the ball chain 6 is circulated in the endless track and flexing and extending thereof are repeated, there is a concern that the ball chain 6 is cut at the connecting portion 62.

Hence, according to a ball chain 8 of the embodiment, a wire 80 penetrating the respective ball holding units 61 is installed and the connecting portion 62 is constituted by the wire 80. Although a method of fabricating such a ball chain 8 is substantially the same as that of the ball chain 6 according to the first embodiment, a single piece of the wire 80 is inserted in a mold along with the balls 3 and the respective ball holding units 61 are molded to the wire 80 at an equal interval by injection molding of synthetic resin.

Further, according to the ball chain 8 of the embodiment where the connecting portion 62 is reinforced by the wire 80, the connecting portion 62 is not broken even by repeated flexing and extending and trouble of breaking the ball chain 8 in the midst of use can be avoided.

Fourth Embodiment

FIG. 9 shows a fourth embodiment of a ball chain according to the present invention.

A ball chain 9 of the embodiment of constituted such that the connecting portion 62 for coupling the respective ball holding units 61 is formed at centers of the spherical seats 63 and a contiguous pair of the ball holding units 61 can be flexed in any direction centering on the connecting portion 62. Therefore, different from the ball chains described above, there is no specific flexing direction in the ball chain 9 and the ball chain 9 can be integrated to the endless track without taking any special consideration in the flexing direction in the endless track of the slider 2.

Further, although according to the linear guide devices mentioned above, the slider is provided with a total of two streaks of the ball endless tracks in which respective streaks are in correspondence with both left and right side faces of the track rail, the linear guide device according to the present invention is not limited thereto but the slider 2 may be provided with a total of four streaks of the ball endless tracks in which respective two streaks are in correspondence with each of both left and right side faces of the track rail 1.

Fifth Embodiment

Figure 10:
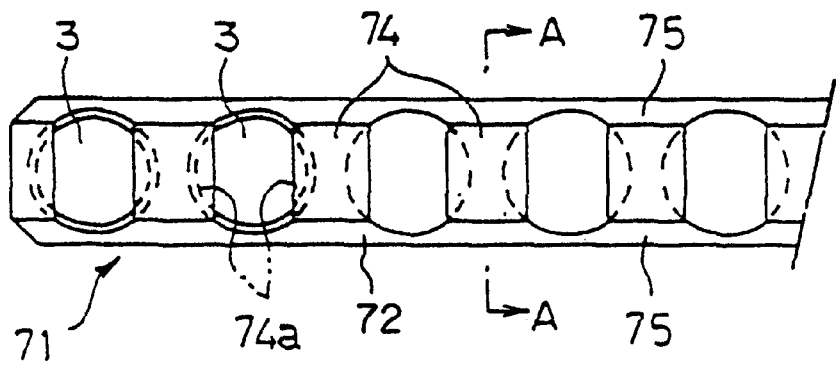
FIG. 10 illustrates a front view and a sectional view showing a fifth embodiment of a ball chain according to the present invention.
Figure 10A:
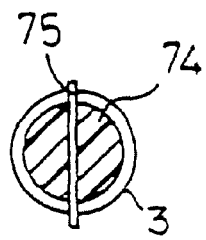

FIG. 10 shows a fifth embodiment of a ball chain according to the present invention.

According to a ball chain 71, the plurality of balls 3 are arranged in a connector belt 72 in one row at a predetermined interval and the balls 3 are rotatable in a state where they are held by the connector belt 72.

The connector belt 72 is constituted by a plurality of ball holding members 74 interposed among the respective balls 3 and a strip-like connecting portion 75 for connecting contiguous ball holding members 74 to each other and spherical seats 74a for embracing the spherical face of the ball 3 are formed at each of the ball holding members 74. Thereby, the respective balls 3 are brought into a state where they are embraced from left and from right by the contiguous ball holding members 74 and are held by such a connector belt 72.

Figure 11A:
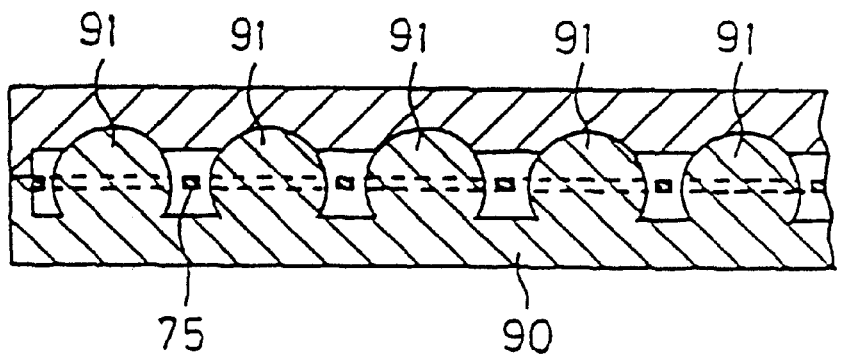
FIGS. 11a and b are front views showing connecting portions according to the fifth embodiment.
Figure 11B:
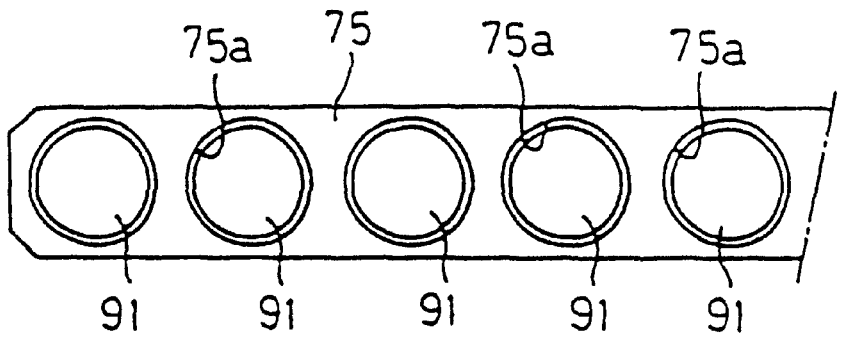

As shown by FIGS. 11(a) and 11(b), according to the connecting portion 75, through holes 75a each having a diameter slightly larger than the diameter of the ball, are formed in a stainless steel sheet (SUS 304 or the like) having a thickness of 0.05 through 0.2 mm which is formed in a strip-like shape and the balls 3 are contained in such through holes 75a. Meanwhile, the ball holding member 74 is molded by synthetic resin of polyamide-base elastomer, polyester-base elastomer or the like and is molded to the connecting portion 75 by injection molding. That is, as shown by FIG. 11(a), ball dies 91 each having a diameter larger than the diameter of the ball 3 are projected at a predetermined interval in a forming mold 90 and as shown by FIG. 11(b), the ball dies 91 are contained in the through holes 75a of the connecting portion 75 and under the state, the ball holding members 74 are molded to the connecting portion 75 by injection molding. Thereafter, the ball dies 91 are forcibly detached from among the ball holding members 74 and the balls 3 are pushed in portions detached from the ball dies 91 by which the ball chain 71 in which the balls 3 are contained in the through holes 75a of the connecting portion 75 by the ball holding members 74 is completed.

Further, the ball chain 71 of the embodiment constituted as described above, is used by being integrated to an endless track of a slider constituting a linear guide device or the like, the tensile strength of the connecting portion 75 formed by a stainless steel sheet is considerably larger than that of the ball holding member 74 made of synthetic resin and accordingly, even when large tensile force is exerted on the ball chain 71 during circulation in the endless track, the ball chain 71 is not broken between the ball holding members 74 contiguous to each other and smooth circulation of the ball chain 71 can always be expected.

Further, the tensile strength of the ball chain 71 per se is dependent on that of the connecting portion 75 and accordingly, it is not necessary to expect mechanical strength such as tensile strength or the like in resin material molding the ball holding members 74 and resin material used in injection molding can be selected only in view of lubrication performance, wear resistance or the like in respect of rolling of the balls 3. Accordingly, smooth rolling of the balls 3 can also be expected.

Sixth Embodiment

Figure 12:
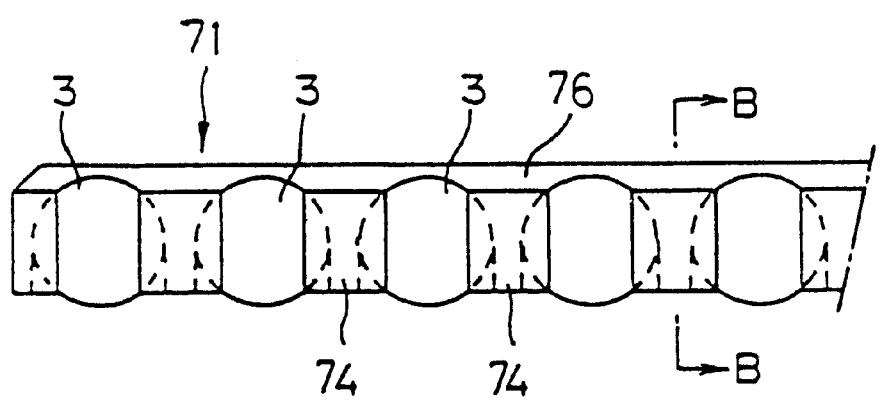
FIG. 12 illustrates a front view and a sectional view showing a sixth embodiment of a ball chain according to the present invention.
Figure 12A:
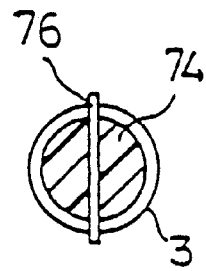

FIG. 12 shows a sixth embodiment of a ball chain according to the present invention.

Although according to the above-described fifth embodiment, the connecting portion 75 is installed along both sides of a row of the balls which are arranged in one row, according to the embodiment, a connecting portion 76 is installed only on one side of the ball row. The other points as well as the constitution and the method of fabrication are the same as those in the fifth embodiment.

Figure 13:
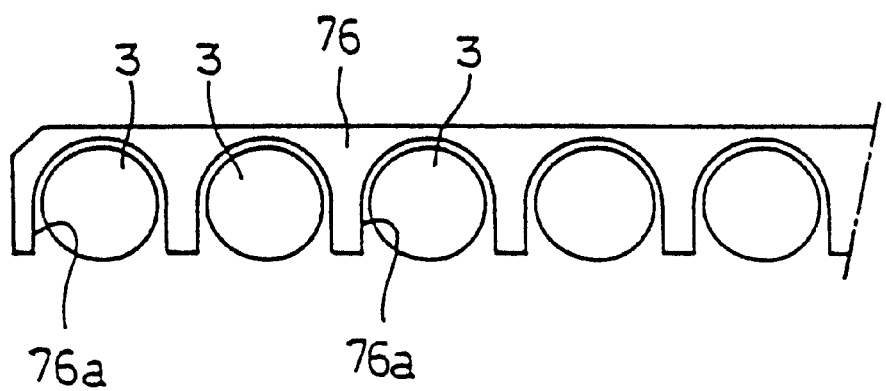
FIG. 13 is a front view showing connecting portions according to the sixth embodiment.
Figure 16:
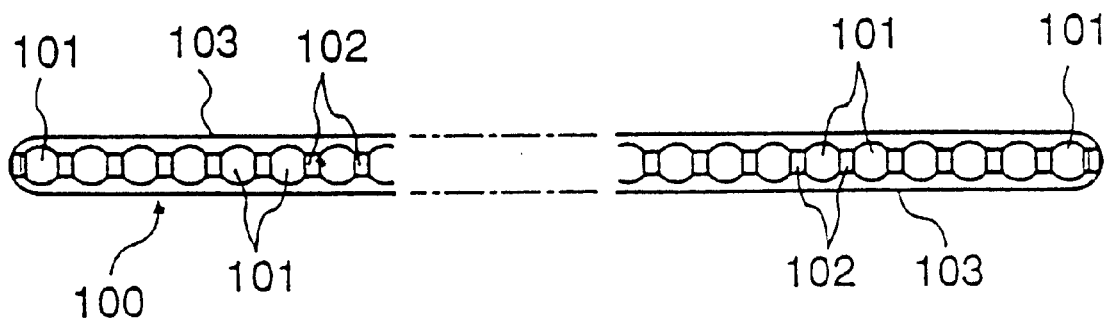
FIG. 16 is a front view showing a conventional ball chain.
Figure 17:
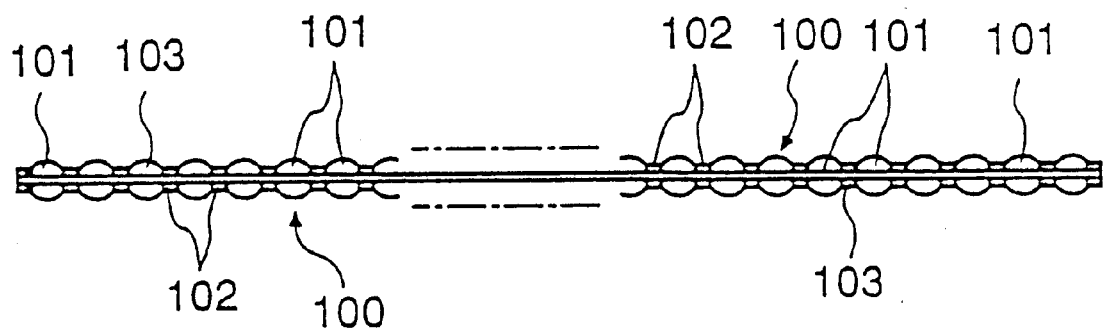
FIG. 17 is a side view showing the conventional ball chain.
Figure 18:
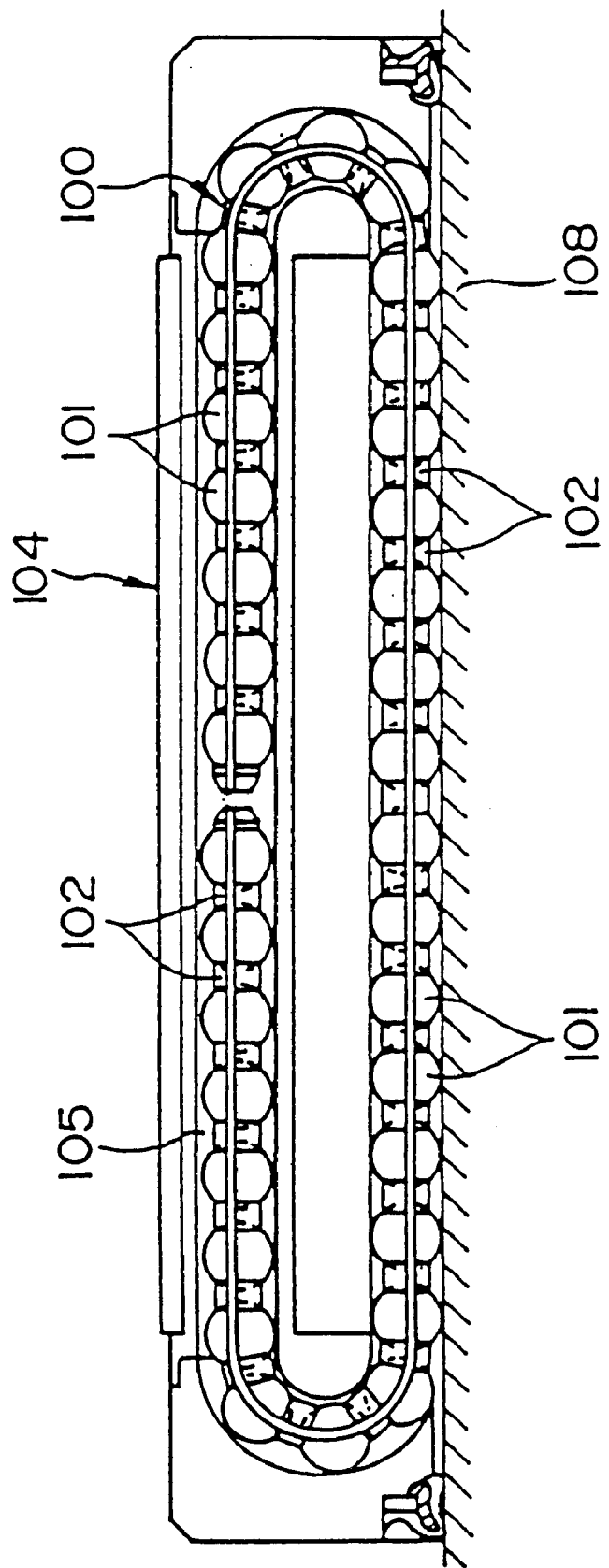
FIG. 18 is a sectional view showing a state in which the ball chain is integrated to an endless track of a slider of a linear guide device.
Figure 19:
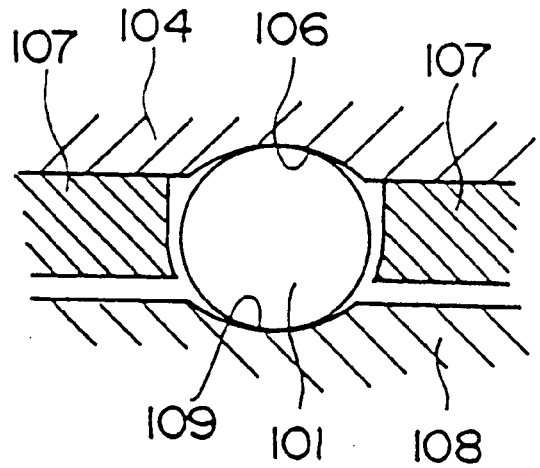
FIG. 19 is a sectional view showing a state of rolling balls in the case where a load rolling groove of a slider and a ball rolling groove of a track rail are formed in a shape of a circular arc.
Figure 20:
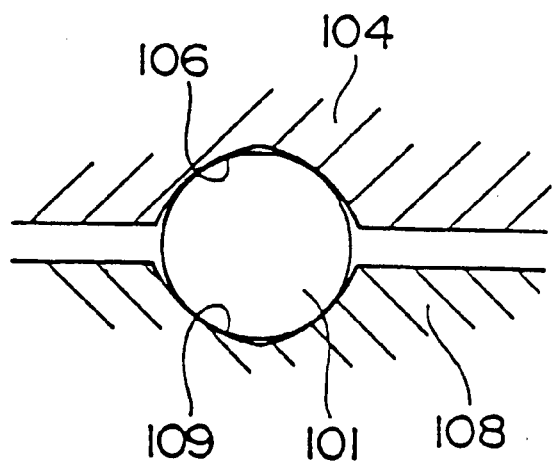
FIG. 20 is a sectional view showing a state of rolling balls in the case where a load rolling groove of the slider and a ball rolling groove of the track rail are formed in a shape of a Gothic arch.

Accordingly, as shown in FIG. 13, according to the connecting portion 76 of the embodiment, notched portions 76a each in a shape of an arch are arranged in the longitudinal direction at a predetermined interval and the balls 3 are contained in the notched portions 76a.

Seventh Embodiment

FIG. 14 shows a seventh embodiment of a ball chain according to the present invention.

Although according to the above-described fifth and sixth embodiments, a stainless steel sheet in a strip-like shape is used as the connecting portion, according to the embodiment, wires 77 each having a slender wire diameter are used as a connecting portion and ball holding members 78 are molded to the wires 77 by using injection molding of synthetic resin.

Each of the ball holding members 78 is arranged to be brought into contact with a single one of the ball and an independent ball holding unit is constituted by a pair of the ball holding members disposed on both sides of the ball. Therefore, even in the case where such a ball chain is used by being flexed extremely, according to each of the ball holding units, a pair of the ball holding members 78 hold the balls 3 with certainly and prevention of detachment of the ball 3 is achieved.

Eighth Embodiment

FIG. 15 shows an eighth embodiment of a ball chain according to the present invention.

Although according to the above-described ball chains of the respective embodiments, the ball holding members 74 interposed among the respective balls 3 are integrated with the connecting portion 75 (or 76) in a strip-like shape by utilizing injection molding of synthetic resin, according to the embodiment, the connecting portion is constituted by a wire 79 having a slender wire diameter and ball holding members 80 previously formed by injection molding of synthetic resin which are penetrated by the wire 79 at a later stage.

That is, the ball holding members 80 are formed with through holes for inserting the wire 79 and by passing the wire 79 through the through holes, the respective ball holding members 80 are connected to each other. Such a wire 79 is folded back by a ball holding member 80a disposed at an end portion of the ball chain and is inserted through the respective ball holding members 80 at both sides of the ball row. Further, a stopper plate for fixedly engaging both end portions of the wire 79 is installed at an end portion of the ball chain, not illustrated, and a detachment preventive processing is carried out on the both end portions of the wire 79 which has passed through all of the ball holding members 80 after they are passed through the stopper plate.

Further, also in the ball chain of the eighth embodiment, the ball holding members 80 made of synthetic resin are connected by the wire 79 having large tensile strength by which the balls 3 are rotatably held and accordingly, even when large tensile force is exerted on the ball chain, the ball chain is not broken between the ball holding members 80 contiguous to each other and by using a resin material excellent in lubrication of the balls 3 for the ball holding members 80, smooth formation of rolling of the balls 3 can be expected.

INDUSTRIAL APPLICABILITY

As has been explained, according to a ball chain of the present invention, a ball holding unit pinching a ball is formed by a pair of spherical seats, the ball chain is constituted by connecting a plurality of the ball holding units and accordingly, even when the ball chain is bent or twisted while it is being used, the balls do not drop off among the spherical seats and the balls can be held by the ball chain with certainty.

Further, according to a ball chain of the present invention, ball holding members interposed among balls contiguous to each other are connected to each other by a connecting portion having a tensile strength higher than that of the ball holding member and accordingly, even when a material for molding the ball holding member which is provided with a low mechanical strength is used, a sufficient tensile strength can be ensured for the ball chain as a whole and accordingly, occurrence of accident of breaking the ball chain while it is being used can be prevented beforehand.

Further, even in the case where the material for molding the ball holding member which is provided with low mechanical strength is used, the tensile strength of the ball chain can be ensured and occurrence of breaking the ball chain can be prevented and accordingly, in selecting a material for molding the ball holding member, consideration is given only in view of lubrication performance, wear resistance or the like in respect of rolling of the balls by which excellent rolling of the balls arranged thereby can be expected.

We claim:

1. A ball chain arranged with a number of balls in one row and rollably holding the balls:
   wherein each of the balls are pinched by a pair of spherical seats and the spherical seats of each pair are connected to each other by flange portions to thereby constitute a ball holding unit and a plurality of the ball holding units are connected in series in the shape of a string of beads by a flexible connecting portion.

2. The ball chain according to claim 1:
   wherein the spherical seats and the flange portions are molded by a resin material and the connecting portion is formed by a material having a tensile strength larger than the tensile strength of the resin material.

3. A linear guide device comprising a track rail having ball rolling grooves each in a shape of a Gothic arch formed by intersecting a pair of ball rolling faces with each other, a slider having load rolling grooves each in a similar shape of a Gothic arch opposed to the ball rolling grooves and no load rolling paths for circulating the balls from one end to other end of each of the load rolling grooves for moving along the track rail and a number of balls rolling between the slider and the track rail while carrying a load and circulating endless tracks constituted by the load rolling grooves and the no load rolling paths of the slider:
   wherein the ball chain according to claim 1 are integrated to each of the endless tracks of the slider such that the flange portions of the ball chain are disposed on an inner peripheral side or an outer peripheral side thereof and escape grooves by which the flange portions of the ball chains are contained and guided are formed at deepest portions of the ball rolling grooves of the track rail and the load rolling grooves of the slider both formed in the shape of the Gothic arch.

* * * * *